April 8, 1947.  A. C. PRICHARD ET AL  2,418,480
ASYMETRICALLY CONDUCTING NETWORK
Filed May 24, 1944
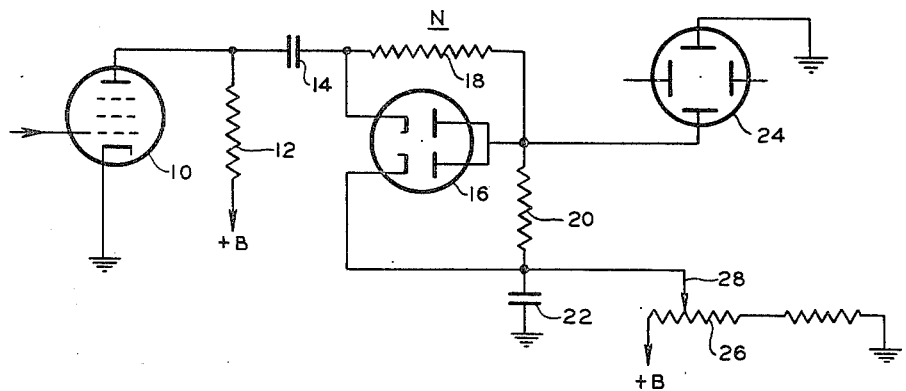
INVENTORS.
ARTHUR C. PRICHARD
IRA O. MYERS
BY
William D. Hall.
ATTORNEY Patented Apr. 8, 1947

2,418,480

UNITED STATES PATENT OFFICE 2,418,480

ASYMMETRICALLY CONDUCTING NETWORK

Arthur C. Prichard, Long Branch, and Ira O. Myers, Neptune, N. J., assignors to the Government of the United States of America, as represented by the Secretary of War Application May 24, 1944, Serial No. 537,122

4 Claims. (Cl. 315—29)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to asymmetrically conducting networks, particularly of the type adapted for use with the pulse amplifier circuits of pulse-echo object detection systems.

In conventional pulse-echo systems, pulses or wave-trains of radio frequency energy are periodically transmitted. When said waves strike a target, reflected pulses are received, and the observed time interval between the transmitted and received pulses is a measure of the distance. For measuring purposes, both the transmitted signals and the receiving echoes are impressed upon the vertical deflection plates of an oscilloscope tube, the horizontal trace, or base line, of said tube being synchronized with the transmitted pulses. The distance between the two vertical deflections of the oscilloscope trace is a measure of the distance of the reflecting object.

In the receiver of such a system, both the transmitted and echo wave-trains are detected to derive the pulse modulation envelopes thereof, which are then amplified by a multi-stage pulse amplifier. Ordinarily, the interstage couplings of said amplifier, as well as the output coupling of the last stage, are reactive circuits; usually resistance-capacity couplings. As a result, the direct-current component of the amplifier plate-circuit output disappears in the output of the reactive coupling, and all pulses have both positive and negative components, the average potential of said pulses varying with variation in amplitude and/or spacing therebetween, which is usually the case in pulse-echo systems. Such varying average potentials tend to cause continuous vertical displacement or distortion of the oscilloscope base line, or portions thereof.

To reduce this tendency, it is customary to insert, between the amplifier output circuit and the deflecting plates of the oscilloscope, an asymmetrically conducting network which is directly coupled to said deflecting plates, and which will pass either the positive or negative component of the pulse, depending, of course, upon the polarity of the pulse output of the amplifier.

It is an object of this invention to devise an asymmetrically conducting network, for the purpose above described, which is relatively simple and effective, and which will have a minimum effect upon the pulse amplitude.

For a better understanding of the invention, together with other and further objects thereof, reference is had to the following description taken in connection with the accompanying drawing, and its scope will be pointed out in the accompanying claims.

In the single figure of the drawing, which is a schematic circuit of the invention, tube 10 represents the amplifier tube in one of the amplifying stages of the pulse amplifier of a pulse-echo system; in this case the final stage. The plate of tube 10 is connected to a source of B-voltage through a load resistor 12. The pulse output across said load resistor is applied, through a .05 mfd. coupling condenser 14, to an asymmetrically conducting network N, consisting of a double diode tube 16 of the 6H6 type, a 22,000 ohm resistor 18, a 53,000 ohm load resistor 20, and a 0.1 mfd. condenser 22, all connected as shown. The voltage across load resistor 20 is impressed upon the vertical deflecting plates of an oscilloscope tube 24, in series with a steady biasing voltage derived from a 420,000 ohm potentiometer 26, connected across a 400 volt B supply. This steady voltage can be adjusted by means of the slider 28 to adjust the initial position of the beam of the oscilloscope. It should be understood that the specific values given are approximate and merely illustrative, and can be modified to suit different operating conditions.

Considering now the response of network N to different polarities, assume that a negative-going pulse appears across load resistor 12. As above pointed out, the direct current component of the plate circuit does not appear on the output side of condenser 14, and hence the pulse output of condenser 14 will have both positive and negative components. For the duration of said positive component, current will flow from condenser 14 through resistor 18, since the upper diode section of the tube 16 is so poled that it is nonconducting for positive potentials. From resistor 18, the current flows from anode to cathode of the lower diode section and then through condenser 22 to ground; condenser 22 being of low impedance to the pulse components. Since the impedance of the lower diode section is small relative to the resistance of resistor 20, no appreciable voltage appears across said resistor and the potential of the beam deflecting plates is not appreciably modified.

For the duration of the negative component of said pulse, current flows from ground, through condenser 22, load resistor 20 (since the lower diode section is so poled that currents from ground cannot flow therethrough), the upper diode section, condenser 14 and plate load resistor 12 to ground. The voltage drop across resistor 20 will now modify the steady potential on the vertical deflecting plates of tube 24 and deflect the beam. Thus it will be seen that only the negative components of each pulse will exercise the greatest control on the beam, resulting in less tendency to distort the horizontal trace of the oscilloscope.

The same network can be adapted for use with an amplifier which yields positive-going pulses in its output, by merely reversing the connections to the elements of the diodes. The network is also of general utility and may be used wherever a rectifying action is desired.

While there has been described what is at present considered a preferred embodiment of the invention, it will be obvious to those skilled in the art that various changes and modifications may be made therein without departing from the invention, and it is, therefore, aimed in the appended claims, to cover all such changes and modifications as fall within the true spirit and scope of the invention.

We claim:

1. An asymmetrically-conducting network comprising an input circuit including a first resistor, a second resistor having a higher resistance than said first resistor, and a low impedance condenser, all connected in series, a diode connected across each resistor in such manner that one of the electrodes of one diode is connected to the like electrode of the other diode, and an output circuit coupled to said higher-resistance resistor.

2. A pulse translating system comprising a pulse amplifier having a reactive output circuit and an asymmetrically-conducting network coupled to said output circuit, said network comprising a pair of resistors, and a low impedance condenser all connected in series across said output circuit, a diode connected across each resistor in such manner that one of the electrodes of one diode is connected to the like electrode of the other diode, and a load circuit connected across one of said resistors.

3. A pulse translating system comprising a pulse amplifier having a reactive output circuit, a cathode-ray tube having beam-control means adapted to be energized by the output of said amplifier, and an asymmetrically-conducting network inserted between said output circuit and said beam-control means; said network comprising a first resistor, a second resistor having a higher resistance than said first resistor, and a low impedance condenser, all connected across said output circuit in series in the order named, a diode connected across each resistor in such manner that one of the electrodes of one diode is connected to the like electrode of the other diode, and means to impress the output across said higher-resistance resistor upon said beam-control means.

4. A pulse translating system comprising a pulse amplifier having a capacitative output circuit, a cathode-ray tube having beam-deflecting means adapted to be energized by the output of said amplifier, and an asymmetrically-conducting network inserted between said output circuit and said beam-deflecting means; said network comprising a first resistor, a second resistor having a higher resistance than said first resistor, and a low impedance condenser, all connected across said output circuit in series in the order named, a diode connected across each resistor in such manner that the plates of both diodes are connected together, a source of adjustable D. C. potential, and means to impress the potentials across said higher-resistance resistor and the potential of said source in series upon said beam-deflecting means.

ARTHUR C. PRICHARD.
IRA O. MYERS.

REFERENCES CITED

The following references are of record in the file of this patent:

UNITED STATES PATENTS

| Number | Name | Date |
|---|---|---|
| 2,173,497 | Schlesinger | Sept. 19, 1939 |
| 2,339,466 | Duft | Jan. 18, 1944 |
| 2,221,115 | Shepard | Nov. 12, 1940 |